(12) United States Patent
Nagatani

(10) Patent No.: US 7,872,779 B2
(45) Date of Patent: Jan. 18, 2011

(54) IMAGE READING APPARATUS INCLUDING DRIVING MODULE

(75) Inventor: Kaname Nagatani, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1169 days.

(21) Appl. No.: 11/470,442

(22) Filed: Sep. 6, 2006

(65) Prior Publication Data

US 2007/0109562 A1 May 17, 2007

(30) Foreign Application Priority Data

Nov. 12, 2005 (KR) ..................... 10-2005-0108300

(51) Int. Cl.
*H04N 1/04* (2006.01)

(52) U.S. Cl. ................. 358/474; 358/497; 358/509; 358/475; 399/212; 271/10.11; 347/104

(58) Field of Classification Search ................. 358/474, 358/497, 496, 475, 509, 486; 347/104, 37, 347/197, 176; 271/10.11, 9.08, 164, 9.11; 399/212, 377
See application file for complete search history.

(56) References Cited

U.S. PATENT DOCUMENTS

| | | | | |
|---|---|---|---|---|
| 4,155,641 A | * | 5/1979 | Sagara et al. | 399/212 |
| 4,158,499 A | * | 6/1979 | Hattori et al. | 399/210 |
| 4,600,293 A | * | 7/1986 | Watanabe | 399/14 |
| 4,636,058 A | * | 1/1987 | Fujii | 399/212 |
| 4,879,604 A | * | 11/1989 | Koshiyouji | 358/474 |
| 4,891,669 A | * | 1/1990 | Hiroki | 399/118 |
| 4,893,196 A | * | 1/1990 | Koshiyouji et al. | 358/474 |
| 5,997,129 A | * | 12/1999 | Matsuhashi | 347/35 |
| 2002/0109864 A1 | * | 8/2002 | Nishikino et al. | 358/418 |
| 2003/0184818 A1 | * | 10/2003 | Mikajiri et al. | 358/474 |
| 2006/0240924 A1 | * | 10/2006 | Osakabe et al. | 474/117 |
| 2007/0047025 A1 | * | 3/2007 | Fujioka et al. | 358/474 |
| 2007/0154241 A1 | * | 7/2007 | Maruno | 399/211 |

FOREIGN PATENT DOCUMENTS

| | | |
|---|---|---|
| CN | 1288167 A | 3/2001 |
| JP | 05-191584 | 7/1993 |
| JP | 2001-358912 | 12/2001 |
| JP | 2002-328437 | 11/2002 |
| KR | 1998-53447 | 9/1998 |

OTHER PUBLICATIONS

Chinese Office Action dated Dec. 14, 2007 issued in CN 200610154277.5.

* cited by examiner

*Primary Examiner*—Negussie Worku
(74) *Attorney, Agent, or Firm*—Stanzione & Kim, LLP

(57) ABSTRACT

An image reading apparatus includes an image sensor fixed to a main body of the image reading apparatus, a light scanning carriage, a light reflection carriage, a pair of transport modules to move the light scanning carriage and the light reflection carriage in a sub-scanning direction with a predetermined speed ratio, and a wire having both ends fixed to the main body of the image reading apparatus and a portion fixed to the light scanning carriage, the wire wound around carriage pulleys of the light reflection carriage and fixing pulleys of the main body. Therefore, an accuracy of a moving of the carriages is improved, thus preventing a defective reading operation. Manufacturing costs of the image reading apparatus are reduced.

29 Claims, 9 Drawing Sheets

IMAGE READING APPARATUS INCLUDING DRIVING MODULE

CROSS-REFERENCE TO RELATED APPLICATIONS

This application claims the priority of Korean Patent Application No. 10-2005-0108300, filed on Nov. 12, 2005, in the Korean Intellectual Property Office, the disclosure of which is incorporated herein in its entirety by reference.

BACKGROUND OF THE INVENTION

1. Field of the Invention

The present general inventive concept relates to an image reading apparatus, and more particularly, to an image reading apparatus in which an image sensor is fixed to a main body of the image reading apparatus and a light scanning carriage that scans a laser onto a document and a light reflection carriage that reflects a light signal to the image sensor are separately moved.

2. Description of the Related Art

Image reading apparatuses scan a laser beam onto a document to read an image printed on a document. Scanners, facsimiles, and multi-function peripherals are examples of the image reading apparatuses.

In order to read the image of the document, a scanning module should move, or the document should be moved. Flat-bed type image reading apparatuses are a type of the image reading apparatus in which the scanning module moves. Sheet-feed type image reading apparatuses are a type of the image reading apparatus in which the document moves. The flat-bed type image reading apparatuses that include an automatic document feeder (ADF) can also perform as the sheet-feed type image reading apparatuses.

The image reading apparatus includes a glass plate on which the document is placed, and the scanning module below the glass plate. The scanning module includes a light scanning carriage scanning light onto the document, an image sensor converting a light signal obtained by reading the document into an electric signal, and a light reflection carriage reflecting the light signal to the image sensor.

The light scanning carriage includes a light source below the glass plate for scanning the light onto the document. For example, the light source can be a halogen lamp having a predetermined length along a main scanning direction of the document, and scans the light along the entire main scanning direction at one time.

The image sensor includes a charge-coupled device (CCD) sensor, a control board controlling the operation of the CCD sensor, and a lens unit focusing light signals onto the CCD sensor.

The light reflection carriage forms an optical path from the light source to the image sensor. The light reflection carriage includes a plurality of mirrors reflecting the light signal obtained by reading the document to the image sensor.

In general, there are two types of the scanning module. One type of the scanning module is an integrated type in which the light scanning carriage, the image sensor, and the light reflection carriage are integrally installed in an outer frame of the scanning module, and the outer frame, the light scanning member, the image sensor, and the light reflection member move together along a sub-scanning direction to read the image of the document. The sub-scanning direction is perpendicular to the main scanning direction.

The second type of scanning module is a separated type, in which the light scanning carriage, the image sensor, and the light reflection carriage are separate. The image sensor is fixed to a main body of the image reading apparatus, and the light scanning carriage and the light reflection carriage move at different speeds from each other along the sub-scanning direction to maintain a total length of the optical path at a constant length. In the separated type scanning module, mass of moving parts can be lower than that in the integrated type scanning module, and thus, the module can move at a high speed. Since the image sensor is fixed to the main body of the image reading apparatus, a resolution can be improved regardless of the size and weight of the sensor. The separate type scanning module is suitable for a high end image reading apparatus that can read large-sized documents at high speed due to a lower mass of inertia of the moving parts.

In an image reading apparatus other than sheet-feed type image reading apparatus, the scanning module should move along the sub-scanning direction to read the image of a document. The image reading apparatus includes a transport module moving the scanning module in the sub-scanning direction. The separated type scanning module includes the transport module that can move the light scanning carriage and the light reflection carriage at different speeds from each other. Therefore, the total length of the optical path from the light source to the image sensor can be maintained constant.

When the size and the weight of the light scanning carriage and the light reflection carriage are increased in order to read a large-sized document, it is hard to control the positions or the velocities of the light scanning carriage and the light reflection carriage. In order to maintain the scanning time at a constant time even when the size of the document increases, the light scanning carriage and the light reflection carriage should move faster. Therefore, a transport module having high accuracy and reliability are required to move the large and heavy light scanning carriage and the light reflection carriage. In addition, when the resolution of the image sensor is high, a precise transport module is required.

The total length of the optical path can be maintained at the constant time when the position of the image sensor, the positions and angles of the mirrors, and a ratio between the velocities of the light scanning carriage and the light reflection carriage are maintained at constant velocities. However, vibrations generated when moving the light scanning carriage and the light reflection carriage, friction, and changes in a driving load may cause a jittering of the light scanning carriage and the light reflection carriage. Thus, the length of the optical path and a reading quality of the image may vary.

SUMMARY OF THE INVENTION

The present general inventive concept provides an image reading apparatus including a transport module that can maintain a fixed ratio between velocities of a light scanning carriage and a light reflection carriage so that the light scanning carriage and the light reflection carriage can have an accurate movement.

Additional aspects and advantages of the present general inventive concept will be set forth in part in the description which follows and, in part, will be obvious from the description, or may be learned by practice of the general inventive concept.

The foregoing and/or other aspects and utilities of the present general inventive concept may be achieved by providing an image reading apparatus including a main body, an image sensor fixed to the main body, a light scanning carriage to scan light onto a document and to reflect a light signal corresponding to scanned light after reading the document, a light reflection carriage to reflect the light signal incident from the light scanning carriage to the image sensor, and a pair of transport modules to move the light scanning carriage and the light reflection carriage in a sub-scanning direction with a speed ratio of 2:1, the pair of the transport modules including, a first fixing pulley and a second fixing pulley connected to a driving source and separated from each other in the sub-scanning direction, a first carriage pulley and a second carriage pulley disposed on the light reflection carriage between the first and second fixing pulleys, and a wire having both ends fixed to the main body and having a portion fixed to the light scanning carriage, the wire being sequentially wound around the first carriage pulley, the second fixing pulley, the first fixing pulley, and the second carriage pulley.

The apparatus may further include, guide rails to support at least one end of each of the light scanning carriage and the light reflection carriage such that the light scanning carriage and the light reflection carriage can move.

The apparatus may further include, a guide shaft inserted into the light scanning carriage and the light reflection carriage such that the light scanning carriage and the light reflection carriage can be moved.

The apparatus may further include a guide shaft formed on the main body to guide the light scanning carriage and the light reflection carriage, installed on an end of each of the light scanning carriage and the light reflection carriage in the main scanning direction, and provided adjacent to the transport module.

The foregoing and/or other aspects and utilities of the present general inventive concept may also be achieved by providing an image reading apparatus, including a main body having a wire fixing portion, a first fixing pulley rotatably mounted on the main body, a second fixing pulley spaced-apart from the first fixing pulley and rotatably mounted on the main body, a light reflecting carriage movably disposed on the main body, and having a first carriage pulley rotatably mounted thereon and a second carriage pulley spaced-apart from the first carriage pulley and rotatably mounted thereon, a light scanning carriage movably disposed on the main body, and a wire wound around the first and second fixing pulleys and the first and second carriage pulleys having both ends coupled to the fixing portions of the main body and a portion fixedly coupled to the light scanning carriage.

BRIEF DESCRIPTION OF THE DRAWINGS

These and/or other aspects and advantages of the present general inventive concept will become apparent and more readily appreciated from the following description of the embodiments, taken in conjunction with the accompanying drawings of which.

DETAILED DESCRIPTION OF THE PREFERRED EMBODIMENTS

Figure 1:
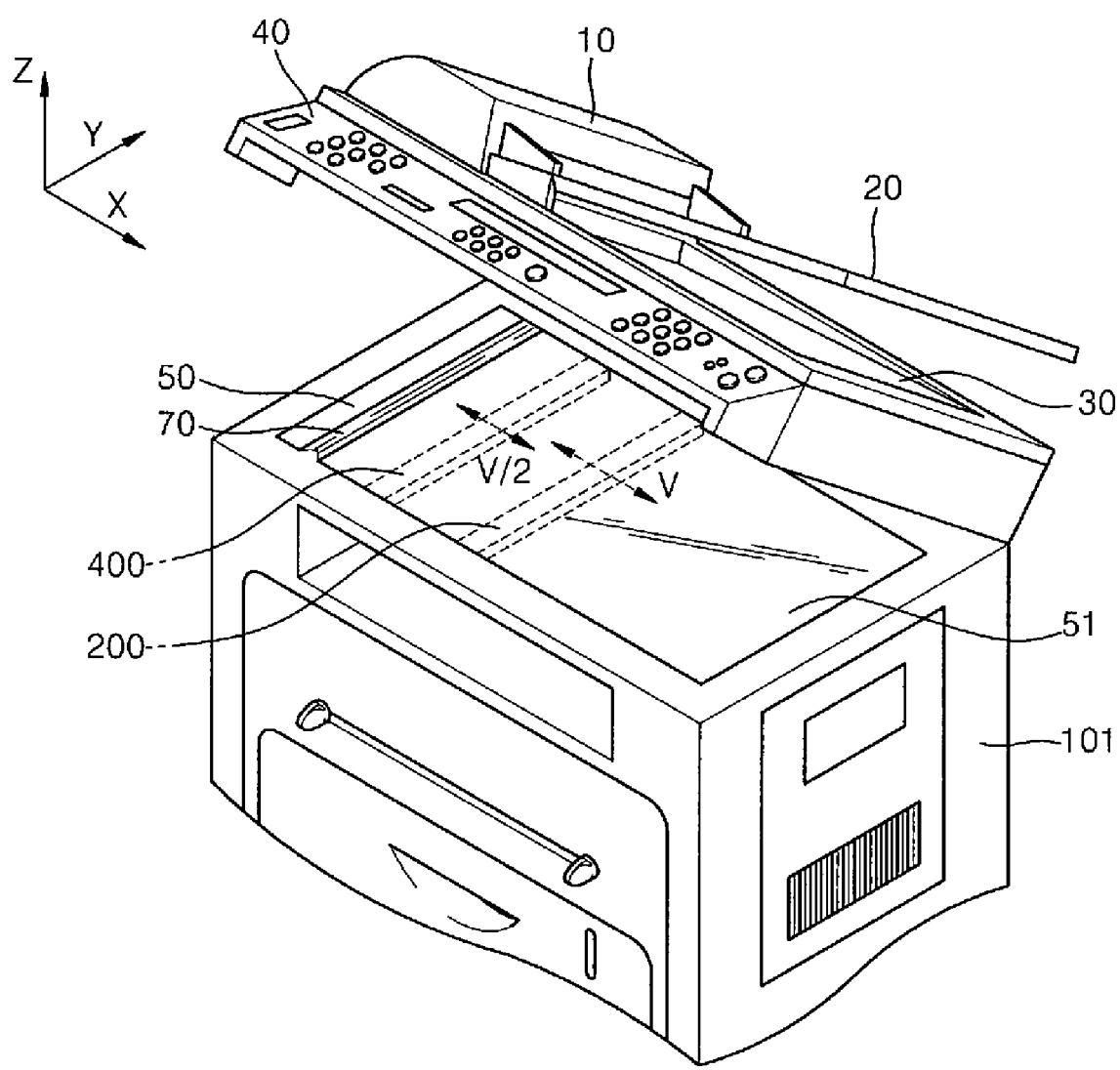
FIG. 1 is a perspective view illustrating an image reading apparatus according to an embodiment of the present general inventive concept.

Reference will now be made in detail to the embodiments of the present general inventive concept, examples of which are illustrated in the accompanying drawings, wherein like reference numerals refer to the like elements throughout. The embodiments are described below in order to explain the present general inventive concept by referring to the figures.

FIG. 1 is a perspective view illustrating an image reading apparatus according to an embodiment of the present general inventive concept. Referring to FIG. 1, the image reading apparatus is a flat-bed type image reading apparatus combined with a sheet-fed type image reading apparatus including an automatic document feeder (ADF) 10. The image reading apparatus includes a main body 101, first and second glass plates 50 and 51 disposed on the main body 101, the ADF 10, a light scanning carriage 200, and a light reflection carriage 400. Although not illustrated in FIG. 1, a printing unit may be included in the main body 101 of the image reading apparatus. In FIG. 1, a sub-scanning direction x is a direction in which the light scanning carriage 200 and the light reflection carriage 400 move to read an image. In addition, a main scanning direction y is a direction in which the light scanning carriage 200 and the light reflection carriage 400 read the entire image of a document P (see FIG. 4) at one time.

The first glass plate 50 contacts the document P conveyed by the ADF 10, and the second glass plate 51 contacts the statically laid document P. The first and second glass plates 50 and 51 are separated from each other. An operational status of the image reading apparatus is displayed and various controlling keys are disposed on a display panel 40.

The document P loaded on a paper supplying board 20 is conveyed to the first glass plate 50 by the ADF 10. The light scanning carriage 200 and the light reflection carriage 400 are located below the first glass plate 50 to read the image of the document P which is fed with respect to the first glass plate 50 by the ADF 10. After the image is read, the document P is discharged to a paper discharge board 30. A document guide member 70 is disposed between end portions of the first and second glass plates 50 and 51. The document guide member 70 guides a front edge of the document P as the document P passes over the first glass plate 50 to the paper discharge board 30.

The document P can be directly supplied to the apparatus without using the ADF 10 by being directly placed on an upper surface of the second glass plate 51. The light scanning carriage 200 and the light reflection carriage 400 move in the sub-scanning direction x below the second glass plate 51 to read the image of the document P. The light scanning carriage 200 is disposed to move with respect to the light reflection carriage 400. The light scanning carriage 200 scans light onto the document P while moving at a first velocity V, and the light reflection carriage 400 reflects light signals incident from the light scanning carriage 200 to an image sensor 500 (see FIG. 4) while moving at a second velocity V/2.

When the light scanning carriage 200 and the light reflection carriage 400 are located below the first glass plate 50, they read the image of the document P that is conveyed by the ADF 10. When the light scanning carriage 200 and the light reflection carriage 400 move below the second glass plate 51, they read the image of the document P that is statically laid. The light scanning carriage 200 and the light reflection carriage 400 are not limited to the above examples.

Figure 2:
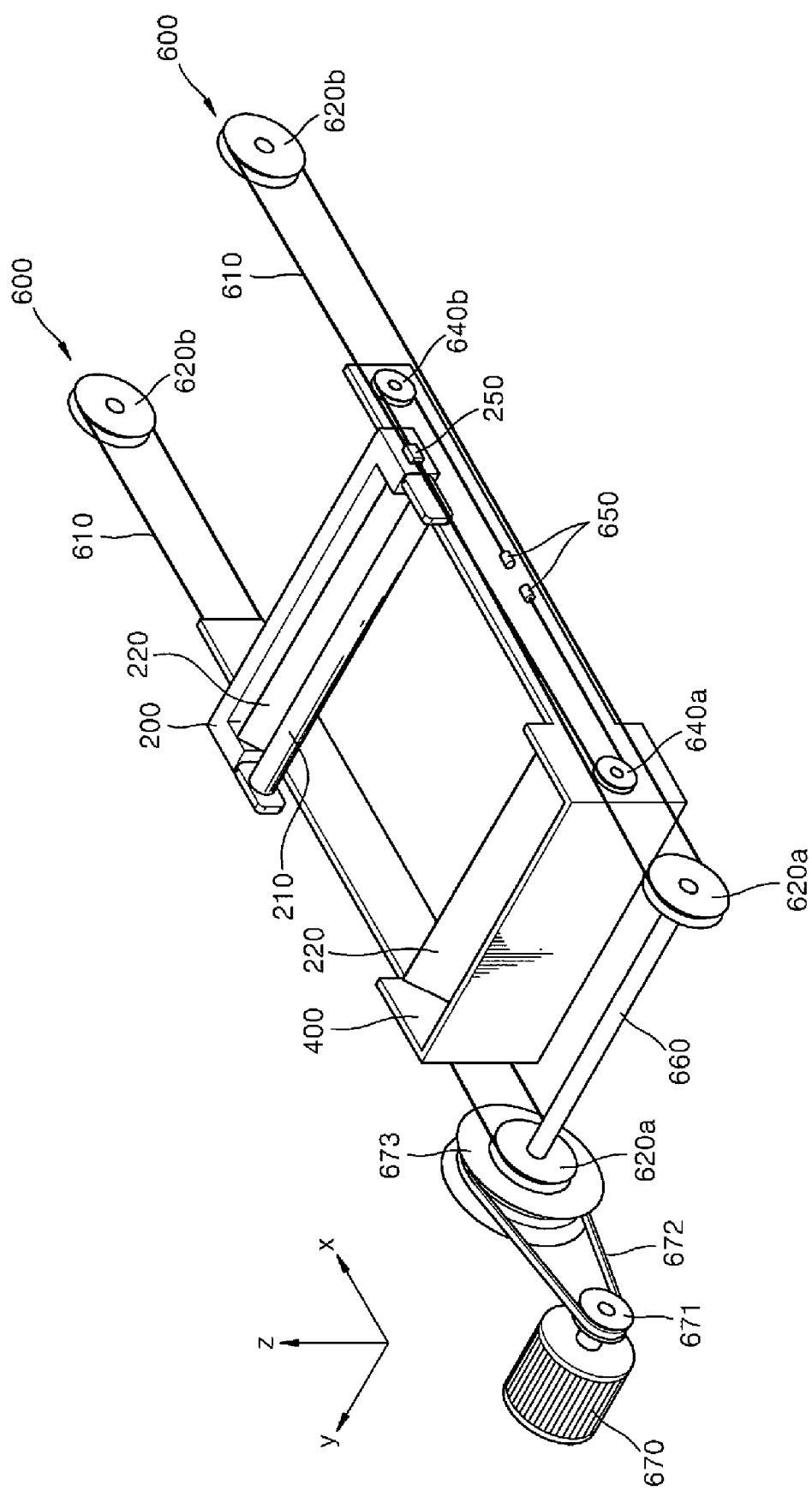
FIG. 2 is a perspective view illustrating a pair of transport modules of the image reading apparatus of FIG. 1.
Figure 3:
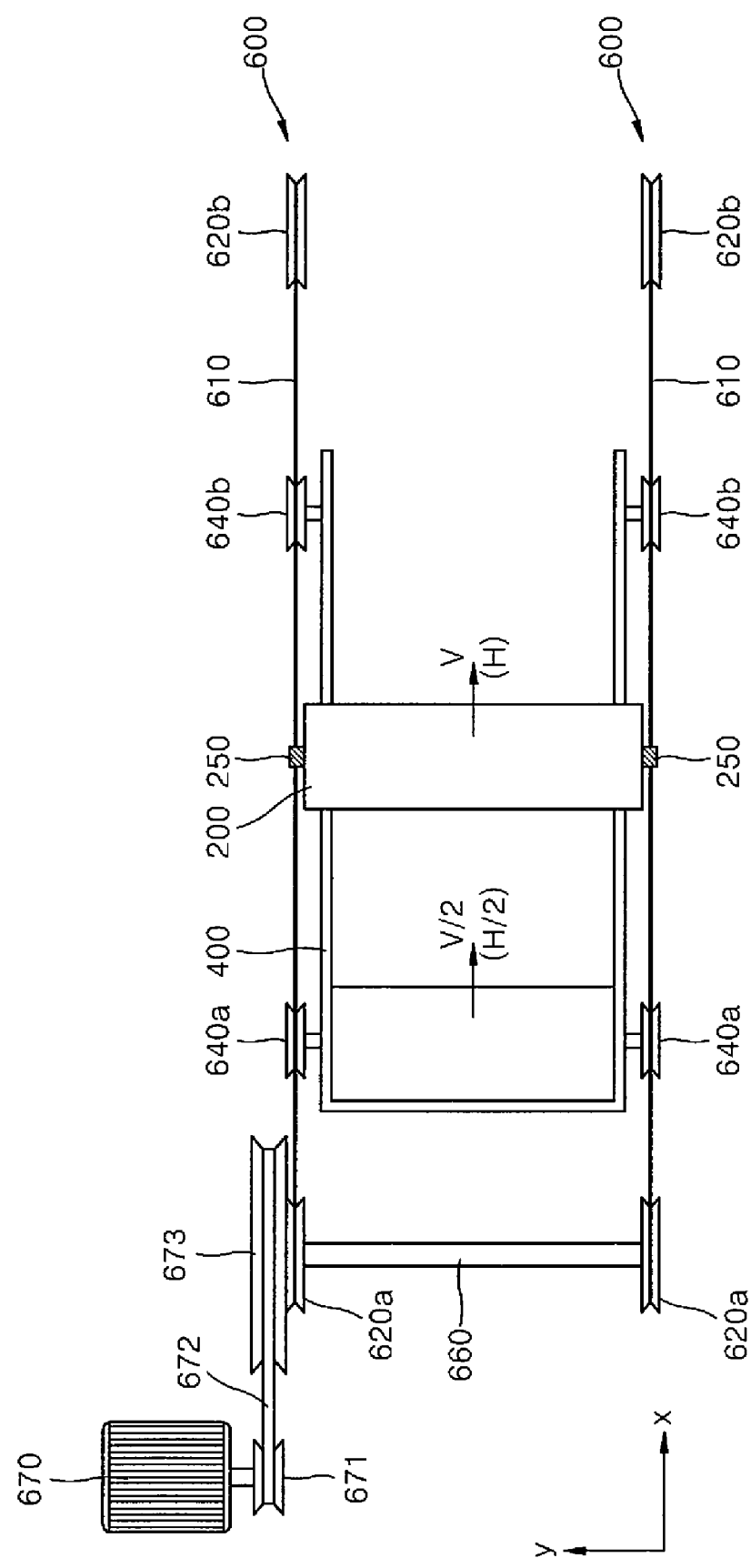
FIG. 3 is a plan view illustrating the pair of transport modules of FIG. 2.
Figure 4:
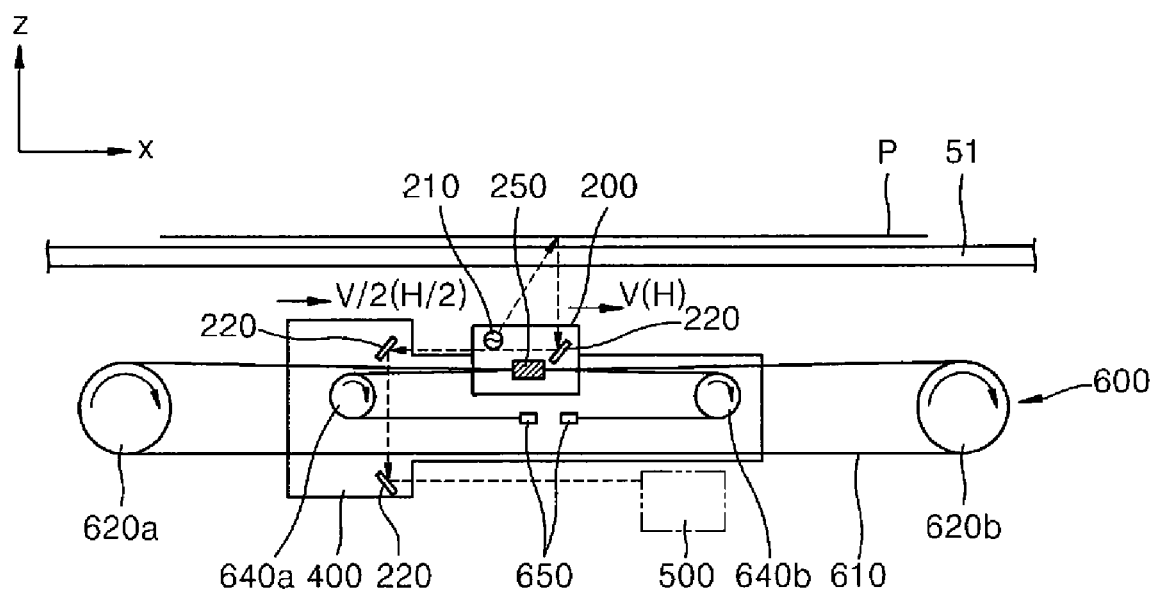
FIG. 4 is a side view illustrating the pair of transport modules of FIG. 2.

FIG. 2 is a perspective view illustrating a pair of transport modules 600 of the image reading apparatus of FIG. 1. FIGS. 3 and 4 are a plan view and a side view, respectively, of the pair of transport modules 600 of FIG. 2. Referring to FIGS. 2 through 4, the light scanning carriage 200, the light reflection carriage 400, the image sensor 500, and the pair of transport modules 600 are illustrated.

The document P is placed on the glass plate 51. The light scanning carriage 200 includes a light source 210 and a mirror 220. The light source 210 scans the light onto the document P. The light reflected by the document P contains image data of the document P, which is defined as a light signal. The light signal is reflected by the mirror 220 toward the light reflection carriage 400.

The light reflection carriage 400 includes a plurality of mirrors 220 and reflects the light signal incident from the light scanning carriage 200 to the image sensor 500.

The image sensor 500 is fixed to the main body 101 of the image reading apparatus. The image sensor 500 converts the light signal obtained by scanning the document P into an electric signal. The image sensor 500 can be a charge coupled device (CCD). The CCD can have a high resolution and a deep focal depth suitable for a large-sized image reading apparatus with high speed that can read documents on A3 paper and larger. Although not illustrated, the image sensor 500 further includes a lens unit to focus the light signal incident from the light reflection carriage 400 to the CCD sensor, and a control board to control the operation of the CCD sensor.

The pair of transport modules 600 are disposed at both ends of the light scanning carriage 200 and the light reflection carriage 400. The transport modules 600 transport the light scanning carriage 200 and the light reflection carriage 400 along the sub-scanning direction x with a ratio of 2:1 between the first and second velocities V and V/2 of the light scanning carriage 200 and the light reflection carriage 400. Each side of the pair of transport modules 600 includes a first fixing pulley 620a and a second fixing pulley 620b, a first carriage pulley 640a and a second carriage pulley 640b, and a wire 610. Either one or both of the pair of transport modules may be connected to a driving source 670. If one driving source 670 is included for the pair of transport modules 600, the pair of transport modules can share a driving power through a driving shaft 660.

Rotary shafts of the first and second fixing pulleys 620a and 620b may be fixed to the main body 101 of the image reading apparatus such that the first and second fixing pulleys 620a and 620b rotate about the rotary shaft mounted on the main body 101, and the first and second fixing pulleys 620a and 620b are separated from each other by a predetermined distance in the sub-scanning direction x. In addition, rotary shafts of the first and second carriage pulleys 640a and 640b are fixed to a side of the light reflection carriage 400, and are separated from each other by a predetermined distance. Both ends of the wire 610 are fixed to a wire fixing portion 650 formed on the main body 101, and a part of the wire 610 is fixed to the side of the light scanning carriage 200 by a fixing member 250. The wire 610 can be coupled to the fixing member 250 at one or more points between where the wire 610 is wound around the first and second fixing pulleys 620a and 620b and where the wire 610 is wound around the first and second carriage pulleys 640a and 640b. To realize this arrangement, first, an end of the wire 610 can be fixed to the wire fixing portion 650, and then, the wire 610 can be sequentially wound around the first carriage pulley 640a, the second fixing pulley 620b, the first fixing pulley 620a, and the second carriage pulley 640b. Then, the other end of the wire 610 is fixed to the wire fixing portion 650. Accordingly, the part of the wire 610 between the fixing member 250 is fixedly coupled to the part of the wire 610 between the first and second fixing pulleys 620a and 620b and the first and second carriage pulleys 640a and 640b. Since a single wire 610 is wound around the pulleys, the accuracy of the ratio of the transporting velocities of the carriages 200 and 400 can be guaranteed, and assembling processes of the apparatus can be simplified and the fabrication costs can be reduced.

The wire 610 moves along the sub-scanning direction x while under a strong tensile force in order to support the weights of the light scanning carriage 200 and the light reflection carriage 400. The wire 610 is formed of a material having high tensile strength and low creep so as not to be deformed by the tensile force. In an embodiment of the present general inventive concept, the wires 610 support both sides of the light scanning carriage 200 and the light reflection carriage 400 along the main scanning direction y.

The two first fixing pulleys 620a or the two second fixing pulleys 620b are paired in the main scanning direction y and are connected on opposite sides of the driving shaft 660. Either one of the two first fixing pulleys 620a or two second fixing pulleys 620b may be connected to the driving source 670. A driving belt 672 is wound around a pulley 671 coupled to the driving source 670 and a pulley 673 coupled to the driving shaft 660, and a rotational force of the driving source 670 is transferred to the driving shaft 660. In the present embodiment, the pair of first fixing pulleys 620a disposed in the main scanning direction y is installed on the driving shaft 660. The light scanning carriage 200 and the light reflection carriage 400 can be moved without vibration or deviation in their respective velocities V and V/2 by the first fixing pulleys 620a installed on the same driving shaft 660.

When the wire 610 travels a distance H per unit time in the sub-scanning direction x direction, the first and second carriage pulleys 640a and 640b travel a distance H/2 per unit time due to the arrangement of pulleys. When an upper portion of the wire 610, which is opposite to the fixing portions 650, moves a distance H in the sub-scanning direction x direction, the first and second carriage pulleys 640a and 640b moves a length H/2. The light scanning carriage 200, to which an upper portion of the wire 610 is fixed, moves a distance H per unit time, and the rotary shafts of the first and second carriage pulleys 640a and 640b and the light reflection carriage 400 move a distance H/2 per unit time, and thus, the ratio between the velocities V and V/2 of the light scanning carriage 200 and the light reflection carriage unit 400 is constant at 2:1. The first and second fixing pulleys 620a and 620b may have a diameter two times greater than that of the first and second carriage pulleys 640a and 640b.

Figure 5:
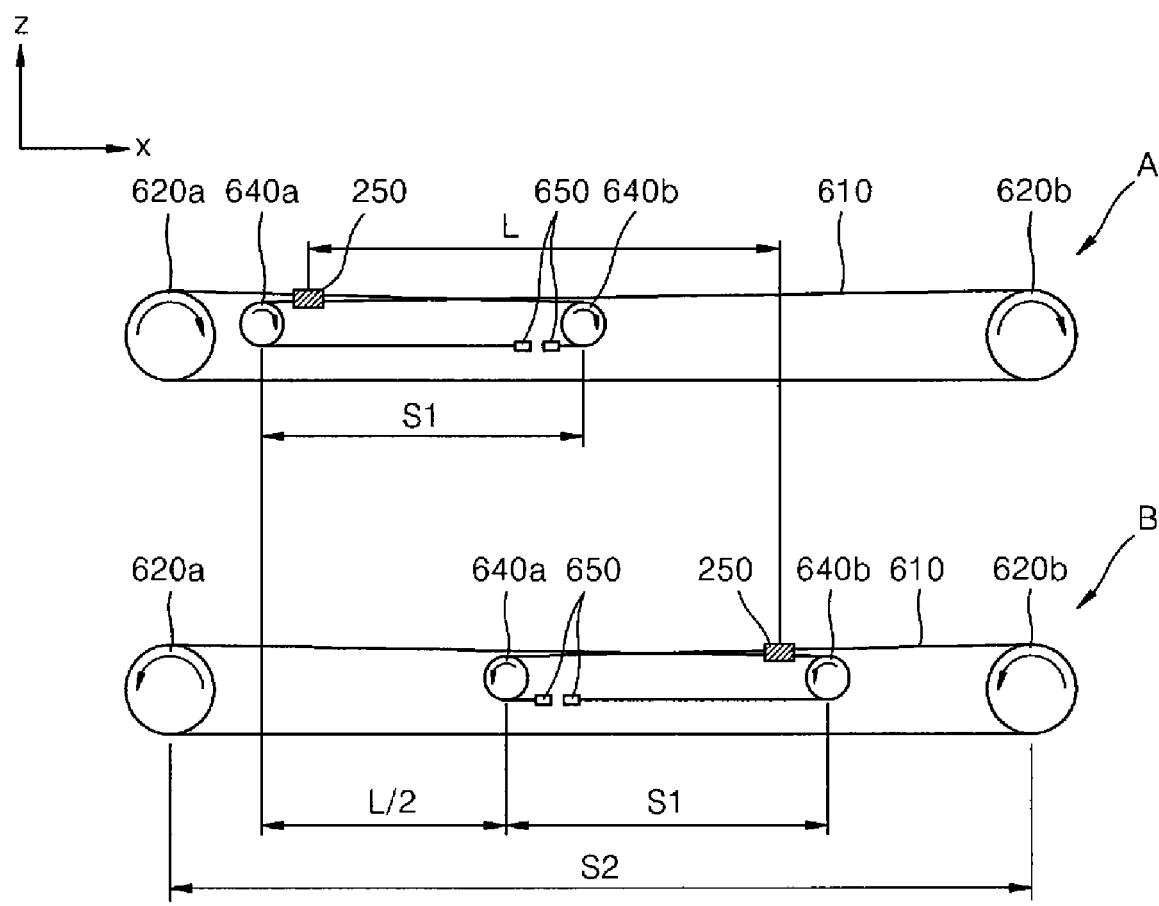
FIG. 5 is a side view illustrating distances between a first fixing pulley and a second fixing pulley and between a first carriage pulley and a second carriage pulley in the transport modules of FIG. 2.

FIG. 5 is a diagram illustrating a distance between the first and second fixing pulleys 620a and 620b and a distance between the first and second carriage pulleys 640a and 640b in the image reading apparatus of FIG. 2. Reference character A illustrates a case in which the light scanning carriage 200 and the light reflection carriage 400 are closest to the first fixing pulley 620a. Reference character B illustrates a case in which the light scanning carriage 200 and the light reflection carriage 400 are closest to the second fixing pulley 620b.

Reference character L denotes a maximum distance the light scanning carriage 200 can travel in the sub-scanning direction x. Therefore, a maximum length of the document P that can be read by the image reading apparatus is the maximum distance L. When the light scanning carriage 200 moves by the maximum distance L, the first and second carriage pulleys 640a and 640b move the distance L/2 due to the arrangement of the pulleys, and the light reflection carriage 400 also moves the distance L/2. Reference character S1 denotes a distance between the first and second carriage pulleys 640a and 640b in the sub-scanning direction x, and reference character S2 denotes a distance between the first and second fixing pulleys 620a and 620b.

Since a portion of the wire 610 between the first and second carriage pulleys 640a and 640b is fixed to the light scanning carriage 200 by the fixing member 250, the light scanning carriage 200 moves between the first and second carriage pulleys 640a and 640b while moving between the first and second fixing pulleys 620a and 620b together with the light reflection carriage 400. Therefore, contact interference between the fixing member 250 and the first and second carriage pulleys 640a and 640b can be prevented.

The distance between the first and second carriage pulleys 640a and 640b may be greater than half of the distance L/2 that the light scanning carriage 200 can move in the sub-scanning direction x. That is, S1 may be greater than L/2. As described above, when the light scanning carriage 200 moves a distance L, the first and second carriage pulleys 640a and 640b move the distance L/2 due to the arrangement of the pulleys. Therefore, S1 the distance between the first and second carriage pulleys 640a and 640b can be greater than the distance L/2 in order to prevent the light scanning carriage 200 and the first and second carriage pulleys 640a and 640b from interfering with each other.

In addition, The distance S2 between the first and second fixing pulleys 620a and 620b may be greater than the sum of half the distance L/2 the light scanning carriage 200 can move in the sub-scanning direction x and the distance S1 between the first and second carriage pulleys 640a and 640b. That is, the distance S2 can be greater than a sum of L/2 and S1. Therefore, the light reflection carriage 400 and the first and second fixing pulleys 620a and 620b do not interfere with each other.

In addition, the first and second carriage pulleys 640a and 640b may have smaller diameters than the first and second fixing pulleys 620a and 620b. Therefore, the path of the wire 610 supported by the first and second carriage pulleys 640a and 640b is inside the path of the wire 610 supported by the first and second fixing pulleys 620a and 620b. The entire wire 610 moves at the same speed, and when the paths of the wire 610 are separated as described above, contact between the wires 610 can be prevented.

Figure 6:
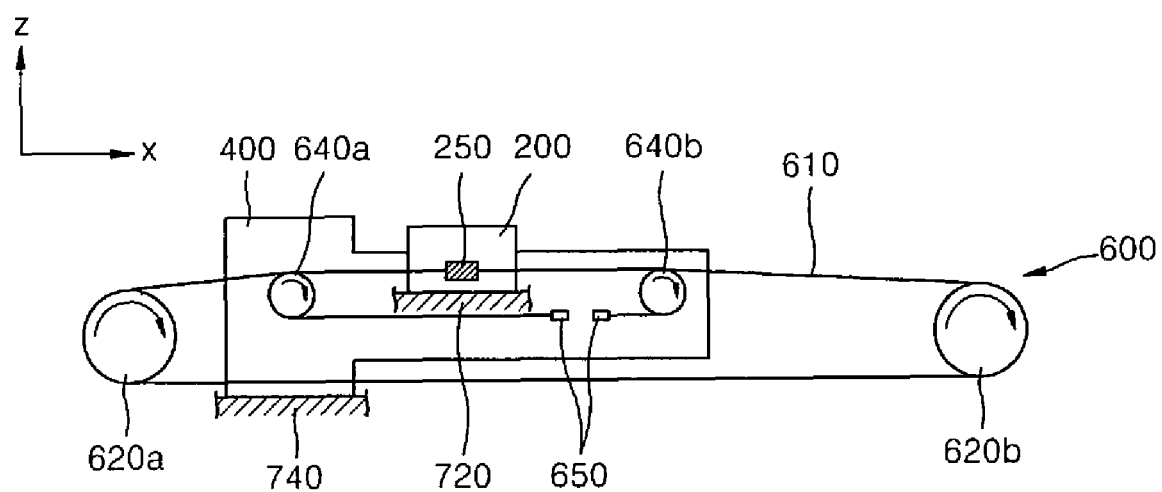
FIG. 6 is a side view illustrating the transport modules of FIG. 2 and guide rails of an image reading apparatus according to an embodiment of the present general inventive concept and the transport modules of FIG. 2.

FIG. 6 is a side view illustrating guide rails 720 and 740 of the transport modules 600 of the image reading apparatus according to another embodiment of the present general inventive concept. The guide rail 720 supports the light scanning carriage 200 and the guide rail 740 supports the light reflection carriage 400. FIGS. 2 through 5 illustrate the light scanning carriage 200 and the light reflection carriage 400 each supported at both ends by the pair of transport modules 600. However, in FIG. 6, the pair of transport modules 600 and the guide rails 720 and 740 support the end portions of the light scanning carriage 200 and the light reflection carriage 400 and guide them. The guide rails 720 and 740 are formed on the main body 101 corresponding ones of the image reading apparatus. The guide rails 720 and 730 support at least one end of each of the light scanning carriage 200 and the light reflection carriage 400 along the main scanning direction y. According to the embodiment of FIGS. 2 through 5, high tension is applied to the wire 610 to support the light scanning carriage 200 and the light reflection carriage 400. However, when the guide rails 720 and 740 are included, the tension applied to the wire 610 can be reduced. When the tension applied to the wire 610 is reduced, radial loads applied to the fixing pulleys 620a and 620b and the carriage pulleys 640a and 640b can likewise be reduced, and thus, a durability of the apparatus can be increased and maintenance costs of the image reading apparatus can be reduced.

In the present embodiment, the wire 610 may pull the light scanning carriage 200 and the light reflection carriage 400 toward the guide rails 720 and 740 to contact the guide rails 720 and 740. Contact with the guide rails 720 and 740 can be achieved by appropriately adjusting installation heights of the guide rails 720 and 740. Therefore, the light scanning carriage 200 and the light reflection carriage 400 can be supported stably in the vertical direction z.

Figure 7:
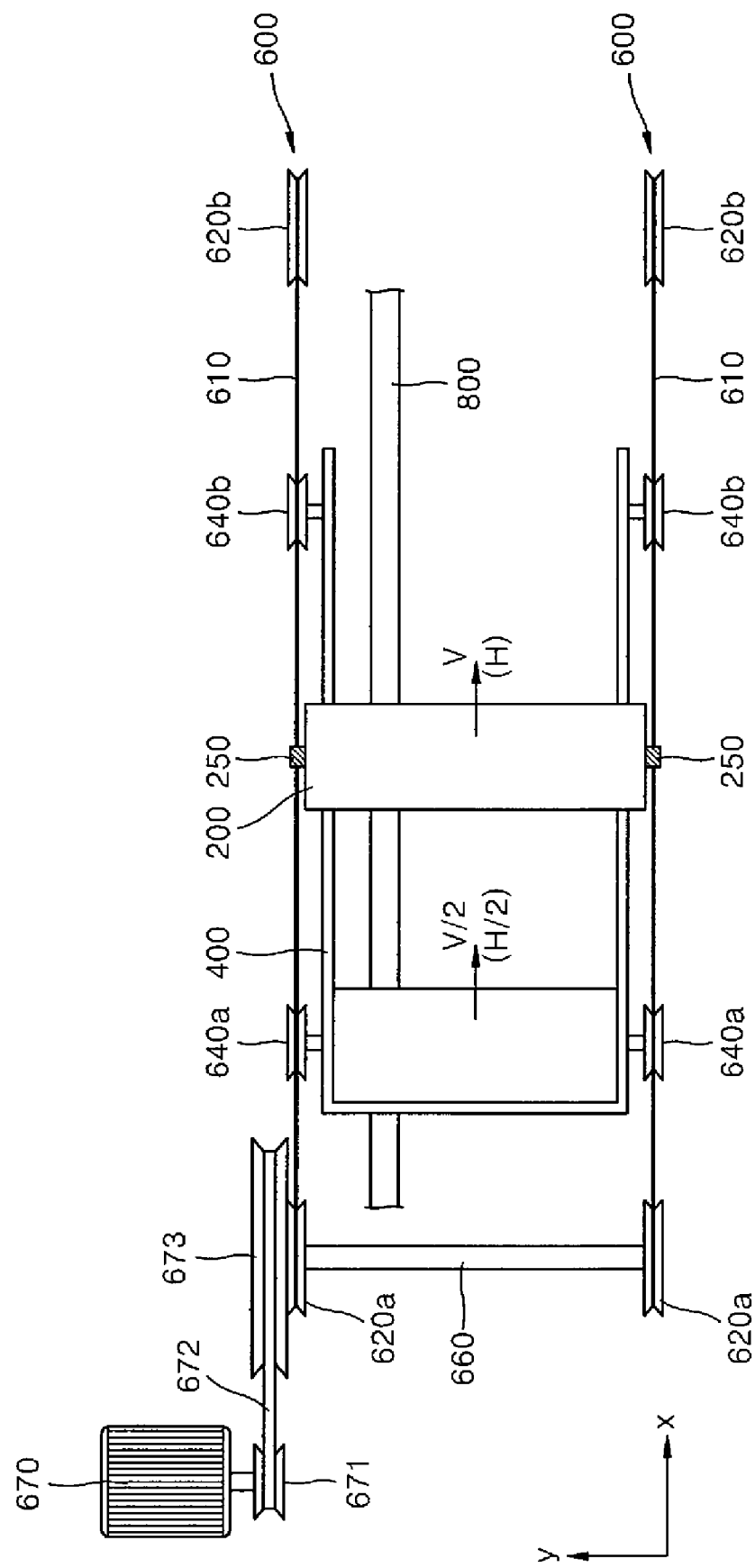
FIG. 7 is a side view illustrating a pair of transport modules and a guide shaft of an image reading apparatus according to an embodiment of the present general inventive concept.

FIG. 7 is a side view illustrating a guide shaft 800 of the transport modules 600 of the image reading apparatus according to another embodiment of the present general inventive concept. Referring to FIG. 7, the image reading apparatus includes the guide shaft 800 in addition to the pair of transport modules 600 to support the end portions of the light scanning carriage 200 and the light reflection carriage 400. The guide shaft 800 is fixed to the main body 101 of the image reading apparatus, and extends in the sub-scanning direction x. The guide shaft 800 is inserted into the light scanning carriage 200 and the light reflection carriage 400 such that the light scanning carriage 200 and the light reflection carriage 400 can move along the guide shaft 800. Although not illustrated in FIG. 7, the light scanning carriage 200 and the light reflection carriage 400 include guide holes formed therein into which the guide shaft 800 is inserted. A sliding bearing (not shown) may also be disposed between the guide shaft 800 and the guide holes. When the guide shaft 800 is disposed at only one end of the light scanning carriage 200 and the light reflection carriage 400, vibrations caused by the friction between the guide shaft 800 and the guide holes can be reduced. The vibration can be reduced, for example, because a zigzag movement of the light scanning carriage 200 and the light reflection carriage 400 along the sub-scanning direction x, due to an accumulation of gap tolerances in a plurality of the guide shafts 800 and the guide holes, is prevented.

Figure 8:
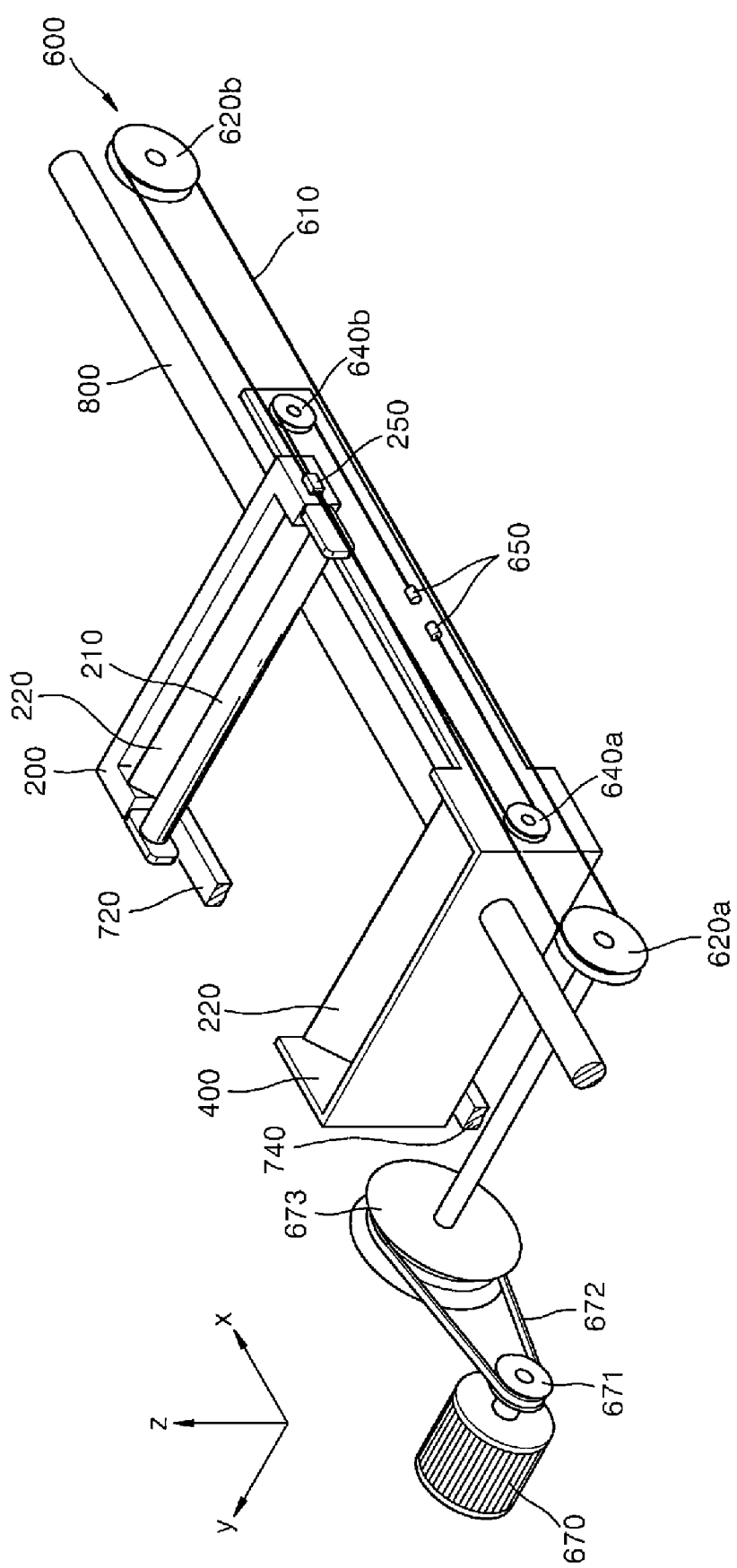
FIG. 8 is a perspective view illustrating a transport module and a guide shaft in an image reading apparatus according to an embodiment of the present general inventive concept.
Figure 9:
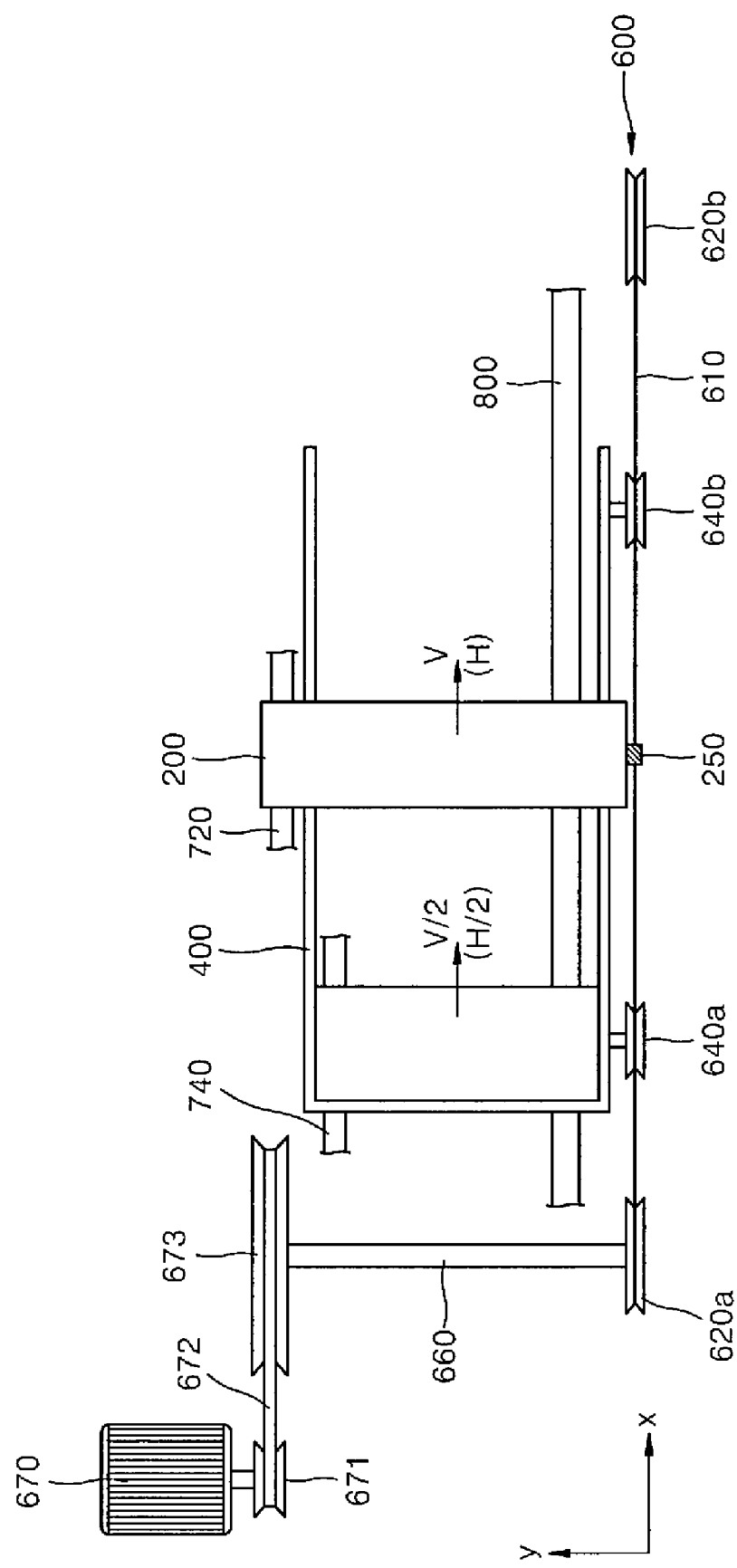
FIG. 9 is a plan view illustrating the transport module and the guide shaft of FIG. 8.

FIGS. 8 and 9 are perspective and plan views illustrating the guide rail 740 and a guide shaft 800 of the transport module 600 according to another embodiment of the present general inventive concept. FIGS. 8 and 9 illustrate the light scanning carriage 200, the light reflection carriage 400, one of the transport modules 600, and the guide shaft 800.

The one transport module 600 is disposed at an end of the light scanning carriage 200 and the light reflection carriage 400. The one transport module 600 and the guide shaft 800 support the weights of the light scanning carriage 200 and the light reflection carriage 400 and guide the light scanning carriage 200 and the light reflection carriage 400 to have an exact movement. The one transport module 600 is described in detail with reference to FIGS. 2 through 5, and a detailed description of the transport module 600 will not be repeated.

The guide shaft 800 may be installed at an end of the light scanning carriage 200 and the light reflection carriage 400 adjacent to the one transport module 600, and extend in the sub-scanning direction x. If the distance between the one transport module 600 and the guide shaft 800 in the main scanning direction y is reduced, a moment magnitude between the one transport module 600 and the guide shaft 800 when moving the light scanning carriage 200 and the light reflection carriage 400 can be reduced, and the carriages 200 and 400 can move stably. The moment magnitude is the value of (the distance between the one transport module 600 and the guide shaft)×(the vibration force generated when the light scanning carriage 200 and the light reflection carriage 400 move in zigzag due to the gap tolerance of the guide shaft 800). Thus, if the distance between the one transport module 600 and the guide shaft 800 is reduced, the moment magnitude is also reduced.

Referring to FIG. 9, the image reading apparatus may further include the guide rails 720 and 740 to support portions of the light scanning carriage 200 and the light reflection carriage 400 which are apart from the guide shaft 800. If the guide shaft 800 is installed adjacent to the one transport module 600, the other ends of the light scanning carriage 200 and the light reflection carriage 400, which are opposite to the guide shaft 800, are free ends. When the distance between the one transport module 600 and the guide shaft 800 in the main scanning direction y is small, additional installation of a unit to support the free ends may be necessary. Therefore, the guide rails 720 and 740 are disposed on the main body 101 of the image reading apparatus to support the other ends of the light scanning carriage 200 and the light reflection carriage 400 and guide the movement of the light scanning carriage 200 and the light reflection carriage 400.

As described above, the light scanning carriage and the light reflection carriage can move with a constant speed ratio therebetween, and thus, a defective image reading can be prevented. In addition, since pulleys installed on a transport module are wound with a same wire, assembling processes can be simplified and manufacturing costs can also be reduced.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. An image reading apparatus comprising:
    a main body;
    an image sensor fixed to the main body;
    a light scanning carriage to scan light onto a document and to reflect a light signal corresponding to the scanned light after reading the document;
    a light reflection carriage to reflect the light signal incident from the light scanning carriage to the image sensor; and
    a pair of transport modules to move the light scanning carriage and the light reflection carriage in a sub-scanning direction with a speed ratio of 2:1, the pair of the transport modules comprising:
        a first fixing pulley and a second fixing pulley connected to a driving source and separated from each other in the sub-scanning direction,
        a first carriage pulley and a second carriage pulley disposed on the light reflection carriage between the first and second fixing pulleys, and
        a wire having both ends fixed to the main body and having a portion fixed to the light scanning carriage, the wire being sequentially wound around the first carriage pulley, the second fixing pulley, the first fixing pulley, and the second carriage pulley.

2. The apparatus of claim 1, wherein the first fixing pulley or the second fixing pulley are installed as a pair on a same driving shaft extending in a main scanning direction, and are connected to the driving source.

3. The apparatus of claim 2, wherein the light scanning carriage moves between the first and second carriage pulleys.

4. The apparatus of claim 3, wherein a distance between the first carriage pulley and the second carriage pulley is greater than a half of a distance that the light scanning carriage can move in the sub-scanning direction.

5. The apparatus of claim 4, wherein a distance between the first fixing pulley and the second fixing pulley is greater than a sum of the half of the distance that the light scanning carriage can move in the sub-scanning direction and the distance between the first carriage pulley and the second carriage pulley.

6. The apparatus of claim 5, wherein the first carriage pulley and the second carriage pulley have smaller diameters than diameters of the first and second fixing pulleys.

7. The apparatus of claim 1, further comprising:
    guide rails to support at least one end of each of the light scanning carriage and the light reflection carriage such that the light scanning carriage and the light reflection carriage can move.

8. The apparatus of claim 7, wherein the wire pulls the light scanning carriage and the light reflection carriage toward the guide rails so that the light scanning carriage and the light reflection carriage contact the guide rails.

9. The apparatus of claim 1, further comprising:
    a guide shaft inserted into the light scanning carriage and the light reflection carriage such that the light scanning carriage and the light reflection carriage can be moved.

10. The apparatus of claim 1, further comprising:
    a guide shaft movably inserted into the light scanning carriage and the light reflection carriage and installed on an end of each of the light scanning carriage and the light reflection carriage in the main scanning direction, and provided adjacent to the transport module.

11. The apparatus of claim 10, wherein the light scanning carriage moves between the first carriage pulley and the second carriage pulley.

12. The apparatus of claim 11, wherein the distance between the first carriage pulley and the second carriage pulley is greater than a half of a distance that the light scanning carriage can move in the sub-scanning direction.

13. The apparatus of claim 12, wherein the distance between the first fixing pulley and the second fixing pulley is greater than a sum of a half of the distance that the light scanning carriage can travel in the sub-scanning direction and the distance between the first carriage pulley and the second carriage pulley.

14. The apparatus of claim 13, wherein the first carriage pulley and the second carriage pulley have smaller diameters than diameters of the first and second fixing pulleys.

15. The apparatus of claim 10, further comprising:
    guide rails to support one end between the both ends of each of the light scanning carriage and the light reflection carriage in the main scanning direction such that the light scanning carriage and the light reflection carriage can be moved, and the end supported by the guide rail is separated from the guide shaft.

16. An image reading apparatus, comprising:
    a main body having a wire fixing portion;
    a first fixing pulley rotatably mounted on the main body;
    a second fixing pulley spaced-apart from the first fixing pulley and rotatably mounted on the main body;
    a light reflecting carriage movably disposed on the main body, and having a first carriage pulley rotatably mounted thereon and a second carriage pulley spaced-apart from the first carriage pulley and rotatably mounted thereon;

a light scanning carriage movably disposed on the main body; and a wire wound around the first and second fixing pulleys and the first and second carriage pulleys, and having both ends coupled to the fixing portions of the main body and a portion fixedly coupled to the light scanning carriage.

17. The image reading apparatus of claim 16, wherein the wire is wound around the first carriage pulley, the second fixing pulley, the first fixing pulley, and the second carriage pulley in order.

18. The image reading apparatus of claim 16, wherein the light scanning carriage comprises a fixing member disposed between the first and second carriage pulleys to be fixedly coupled to the portion of the wire.

19. The image reading apparatus of claim 16, further comprising:
a power source to be connected to at least one of the first fixing pulley and the second fixing pulley.

20. The image reading apparatus of claim 16, wherein the first and second carriages are disposed between the first and second fixing pulleys.

21. The image reading apparatus of claim 16, wherein the portion of the wire is disposed opposite to the wire fixing portion with respect to a line connecting rotate axes of the first and second carriage pulleys.

22. The image reading apparatus of claim 16, wherein a ratio of diameters of the first fixing pulley and the first carriage pulley is the same as a ratio of speeds of the light scanning carriage and the light reflecting carriage.

23. The image reading apparatus of claim 16, wherein the wire fixing portion is spaced apart from the first fixing pulley by a distance less than a maximum moving distance of the light reflecting carriage.

24. The image reading apparatus of claim 16, wherein the wire fixing portion is disposed between the first and second carriage pulleys.

25. The image reading apparatus of claim 16, wherein the main body comprises a first guide member to guide a movement of the light reflecting carriage and a second guide member to guide a movement of the light scanning carriage.

26. An image reading apparatus comprising:
a main body;
a light reflection carriage moveable along a scanning axis in the main body;
a light scanning carriage coupled to the light reflection carriage to move along the scanning axis in the main body;
a first fixing pulley and a second fixing pulley rotatably coupled to the main body and separated from each other along the scanning axis;
a first carriage pulley and a second carriage pulley rotatably coupled to the light reflection carriage between the first and second fixing pulleys; and
a wire having both ends fixed to the main body and having a portion fixed to the light scanning carriage, the wire being sequentially wound around the first carriage pulley, the second fixing pulley, the first fixing pulley, and the second carriage pulley to move the first and second carriage pulleys along the scanning axis between the first and second fixing pulleys.

27. The image reading apparatus of claim 26, further comprising:
a first fixing rotary shaft extending perpendicular to the scanning direction axis and coupled to the main body and the first fixing pulley to rotate the first fixing pulley in a direction of the scanning axis; and
a second fixing rotary shaft positioned opposite the first fixing rotary shaft along the scanning axis and extending perpendicular to the scanning axis and coupled to the main body and the first fixing pulley to rotate the first fixing pulley in a direction of the scanning axis.

28. The image reading apparatus of claim 27, further comprising:
a first carriage rotary shaft extending perpendicular to the scanning axis and coupled to the light reflection carriage and the first carriage pulley to rotate the first carriage pulley in a direction of the scanning axis; and
a second carriage rotary shaft positioned opposite the first carriage rotary shaft along the scanning axis and extending perpendicular to the scanning axis and coupled to the light reflection carriage and the second carriage pulley to rotate the second carriage pulley in a direction of the scanning axis.

29. The image reading apparatus of claim 26, wherein the wire forms an inner loop surrounding the first and second carriage pulleys and an outer loop surrounding the first and second fixing pulleys and the inner loop where the inner loop moves along the scanning axis between the outer loop in response to moving the light reflection carriage.

* * * * *